(12) United States Patent
Eilken et al.

(10) Patent No.: US 9,669,928 B2
(45) Date of Patent: Jun. 6, 2017

(54) MULTIPART FASTENING DEVICE FOR FASTENING A DEVICE TO A REINFORCING ELEMENT AND TO THE OUTER SKIN OF A VEHICLE

(71) Applicant: Airbus Operations GmbH, Hamburg (DE)

(72) Inventors: Wolfgang Eilken, Hamburg (DE); Memis Tiryaki, Hamburg (DE); Michael Sauer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/935,507

(22) Filed: Nov. 9, 2015

(65) Prior Publication Data
US 2016/0137299 A1     May 19, 2016

(30) Foreign Application Priority Data
Nov. 13, 2014 (DE) .................. 10 2014 116 638

(51) Int. Cl.
*B60P 7/08* (2006.01)
*B64D 9/00* (2006.01)

(52) U.S. Cl.
CPC .............. *B64D 9/00* (2013.01); *B60P 7/0807* (2013.01)

(58) Field of Classification Search
CPC ................................ B60P 7/0807; B64D 9/00
USPC ........ 410/101, 102, 106, 109, 110, 112, 113, 410/114, 116; 24/265 CD, 115 K; 244/118.1, 137.1; 248/499
See application file for complete search history.

(56) References Cited

U.S. PATENT DOCUMENTS

| 2,481,598 | A | * | 9/1949 | Jones .................... B60P 7/0807 410/102 |
| 5,649,888 | A | | 7/1997 | Micale et al. |
| 8,393,838 | B2 | * | 3/2013 | Plazek .................. B60P 7/0807 410/104 |
| 2009/0321567 | A1 | | 12/2009 | Carsten et al. |

FOREIGN PATENT DOCUMENTS

| DE | 3302618 A1 | 8/1984 |
| DE | 102011114098 A1 | 3/2013 |
| DE | 102011085450 A1 | 5/2013 |

OTHER PUBLICATIONS

German Patent Office, German Search Report for German Patent Application No. 102014116638.8 mailed on Jun. 23, 2015.

* cited by examiner

*Primary Examiner* — Stephen Gordon
(74) *Attorney, Agent, or Firm* — Lorenz & Kopf, LLC

(57) ABSTRACT

This relates to a multi-part attachment device for attaching a device to a stiffening element and to an outer skin of a vehicle. The multi-part attachment device comprises a base body having an angular profile for attaching the attachment device to the stiffening element and to the outer skin of the vehicle. Furthermore, the multi-part attachment device comprises an upper part with a lug, wherein the upper part is attached to the base body. This also relates to a method for attaching a device to a stiffening element and to an outer skin of a vehicle as well as to an aircraft with a multi-part attachment device.

10 Claims, 3 Drawing Sheets

MULTIPART FASTENING DEVICE FOR FASTENING A DEVICE TO A REINFORCING ELEMENT AND TO THE OUTER SKIN OF A VEHICLE

CROSS-REFERENCE TO RELATED APPLICATIONS

This application claims priority to German Patent Application No. 10 2014 116 638.8, filed 13 Nov. 2014, which is incorporated herein by reference in its entirety.

TECHNICAL FIELD

This relates to the fastening of components or devices in a vehicle. This relates to a multipart fastening device for fastening a device to a reinforcing element and to the outer skin of a vehicle. This further relates to a method for fastening a device to a reinforcing element and to the outer skin of a vehicle, as well as to an aircraft with a multipart fastening device for fastening a device to a reinforcing element and to the outer skin of a vehicle.

BACKGROUND

Transport items or devices in airplanes are normally secured against slippage during airplane operation. Such fastening devices are often secured to frame structures or reinforcing elements, such as ribs or stringers. The transport objects or devices can be fastened to the fuselage structure of the airplane by means of these fastening devices. Because such a fastening device can be exposed to high loads, in particular during flight or various flying maneuvers, it may be fabricated out of a resistant material that meets the weight requirements. This may be important, in particular, in vehicles or aircraft. For example, such fastening devices are manufactured using blanks that were milled into a specific shape in the production process. Depending on the material, this process can be expensive and time-intensive.

DE 10 2011 114 098 A1 shows a fastening device for fastening components to a fastening structure of a transport means. The fastening device exhibits a clamping device for introduction into an opening in the fastening structure, and an actuating device joined with the clamping device.

DE 10 2011 085 450 A1 describes a linking arrangement for linking a component to a base part, wherein the connecting arrangement exhibits a fixing device for fixing the component and a connecting device for load transfer.

SUMMARY

This relates to a multipart fastening device for fastening a device to a reinforcing element and to the outer skin of a vehicle. The multipart fastening device that is also referred to below simply as fastening device, exhibits a base body in the form of an angled profile for fastening the fastening device to the reinforcing element and to the outer skin of the vehicle. The multipart fastening device further exhibits a top element with an eyelet, wherein the top element is fastened to the base body. Thus, the top element may not be in direct contact with the outer skin of the vehicle.

Such a multipart fastening device may make it possible to reduce the material outlay while manufacturing a fastening device. Instead of fabricating the fastening device out of a block or blank, for example via milling, manufacturing the multipart fastening device may make it possible to use base profiles adjusted to the respective parts of the fastening device in the production process already, for example an L-profile, to have the latter yield the final shape of the individual parts of the fastening device. This means that an already angled profile, e.g., an L-profile, can be used in manufacturing the base body, so as to mill the final shape of the base body out of the L-profile. For example, one cross section of the base body exhibits an angled profile that can differ from a cross section of an L-profile. As opposed to the L-profile, the angle between the two flanges or legs of the angled profile can differ from 90 degrees. For example, the top element with the eyelet can be fabricated in a separate production process, also via milling or forming. After the base body and top element have been fabricated, these two parts can be joined together and fastened to the reinforcing element and outer skin of the vehicle. Putting together these two parts, i.e., the base body and top element, makes it possible to significantly reduce the material used in manufacturing the fastening device by comparison to a method in which the fastening device along with the base body and top element are fabricated out of a single blank or block. In other words, the base body as well as the top element according to the embodiment are separately fabricated, wherein the production process utilizes blanks that are already basically similar to the final shape of the base body and top element already before the two parts are made. As a result, potentially less material must be removed during a milling process to obtain the final shape of the base body or top element. This will be explained in even greater detail in the description to the figures. Let it be noted that additional manufacturing methods other than milling are also possible. For example, forming processes may be used.

The multipart fastening device is fastened to a partial piece of the outer skin of the vehicle, as well as to a reinforcing element of the vehicle. The reinforcing element can exhibit a ribbed shape, and be connected with the outer skin of the vehicle or fastened thereto. For example, the reinforcing element and/or outer skin of the vehicle can be made out of a fiber composite or a multilayer composite. In particular carbon fiber-reinforced plastic (CFK) is used for this purpose. However, the reinforcing element and/or the outer skin of the vehicle can also be fabricated out of other materials, for example metal alloys. At any rate, the fastening device is aligned in such a way inside the vehicle when in a fastened state as to be simultaneously fastened to the reinforcing element and outer skin of the vehicle. The device can here be fastened to the outer skin and reinforcing element by means of a fastener. The reinforcing element can also exhibit a profiled cross section.

For example, the reinforcing element exhibits an S-shaped profile cross section. The profile cross section is here the cross section of the profile aligned transverse to a longitudinal direction of the profile. The longitudinal direction of an often bar-shaped profile thus runs perpendicular to the profile cross section. The base body exhibits an angled profile in its cross section. This means that the cross section of the base body exhibits two partial areas that are aligned at a specific angle relative to each other. These areas are referred to below as flanges. The top element can be positively and/or non-positively joined with the base body. For example, the top element is fastened to the base body by means of a fastener, so that the base body and top element contact each other by way of at least one, but preferably two, contact surfaces. The eyelet of the top element is ring-shaped. The eyelet exhibits an opening, in which a connecting element of the device to be fastened can be mounted. For example, such a device is a container or an electrical device, which is secured against slippage inside of the vehicle. In particular, the fastening device can be used to fasten a vacuum generator for wastewater tanks of the vehicle. To this end, the vacuum generator is fastened by means of a strut in the eyelet of the top element of the fastening device. The vehicle can be an aircraft, rail vehicle, or road vehicle. In particular, however, the vehicle is an airplane.

In an embodiment, the base body is fastened to the reinforcing element and to the outer skin of the vehicle by means of a rivet joint.

It may be possible for the base body to be joined with the reinforcing element via a first contact surface, and with the outer skin of the vehicle via a second contact surface. As many rivets as desired can be provided for fastening the base body to the reinforcing element. However, six rivet joints are preferably provided for fastening the base body to the reinforcing element. As many rivets as desired can also be provided for fastening the base body to the outer skin of the vehicle. However, six rivet joints are here preferably also provided for fastening the base body to the outer skin of the vehicle. The rivet joints can here be arranged side by side along a line in relation to the base body, wherein the line can be aligned perpendicular to the longitudinal axis of the vehicle with the fastening device in the fastened state. However, other joining processes can also be used as an alternative to a rivet joint, such as welding processes or soldering processes for fastening the base body to the reinforcing element or for fastening the base body to the outer skin of the vehicle.

In another embodiment, the top element is fastened to the base body and, if necessary, also to the outer skin by means of a rivet joint.

The top element may be fastened to the base body in such a way as not to produce any direct contact between the top element and outer skin of the vehicle. Likewise, the top element can be fastened to the base body in such a way that the top piece is not in direct contact with the reinforcing element. In other words, the top element can only be joined with the outer skin or reinforcing element via the base body. The top element can here be fastened to the base body by means of as many rivet joints as desired. However, four rivet joints or six rivet joints are preferably provided for fastening the top element to the base body. The rivet joints or the rivets that join the top element with the base body, i.e., fasten it to the base body, can penetrate through the base body, so that the rivets that fasten the top element to the base body simultaneously also fasten the entire fastening device, which encompasses the top element and base body, to the outer skin or reinforcing element.

In another embodiment, the reinforcing structure is selected from the group comprised of ribs, stringers and frame structure.

For example, this can be a rib or stringer inside of an airplane fuselage. The reinforcing element can exhibit a profiled cross section. However, such a fastening device can also be fastened to other structural components of the vehicle or airplane. For example, such structural components can be support structures arranged inside the fuselage of the vehicle or airplane and/or fastened to the outer skin of the vehicle or airplane.

In another embodiment, the angled profile exhibits a first plate-shaped partial area and a second plate-shaped partial area. The two plate-shaped partial areas can be inclined relative to each other at an obtuse angle.

Plate-shaped here means that the lateral expansions of the partial area of the base body exceed its thickness. For example, the first plate-shaped partial area exhibits a surface that forms the contact surface with the reinforcing element when the base body is fastened to the reinforcing element. Similarly to the above, the second plate-shaped partial area can exhibit a surface that is in contact with the outer skin of the vehicle when the base body is fastened to the outer skin. The second plate-shaped partial area can here also exhibit a curved contour, thereby giving rise to a shell-shaped partial area of the base body at this location, which is in contact with the outer skin of the vehicle. The shell-shaped partial area of the base body can thus emulate the contour or progression of a fuselage section. This means that the second shell-shaped partial area is curved, so that the latter runs along the inner contour of the outer skin of the vehicle or airplane. The surface of the second plate-shaped or second shell-shaped partial area can be provided with a bulge, which engages into a recess of the outer skin or establishes a positive contact with the latter when the base body is fastened to the outer skin by means of rivet joints. If the base body is fastened to the reinforcing element, the first plate-shaped partial area can be aligned essentially perpendicular to the longitudinal direction of the vehicle or airplane. For example, this is the case when the first plate-shaped partial area is fastened to a rib of an airplane by means of rivet joints.

In another embodiment, the angle between the two plate-shaped partial areas measures between 90° and 110°.

The first plate-shaped partial area can exhibit a transition to the second plate-shaped or shell-shaped partial area with an inner radius. The radius can be incorporated by the process used in manufacturing the base body, for example milling. The angled profile of the base body allows the latter to be fastened to both the reinforcing element and outer skin of the vehicle when in a fastened state.

In another embodiment, the base body consists of a first material, and the top element consists of a second material that differs from the first material.

For example, the first material or material of the base body is a titanium alloy. For example, such an alloy is the Ti6Al-4V titanium alloy. Using an aluminum alloy for the top element makes it possible to save on weight, wherein a sufficient stability for fastening the device to the reinforcing element or outer skin can also be achieved. However, let it be noted that any other alloys or materials desired can be used for the top element or base body. The base body and top element can be fabricated out of different materials, since the fastening device consists of multiple parts, and is not made out of a single blank.

Another aspect of the embodiment indicates a method for fastening a device to a reinforcing element and to the outer skin of a vehicle. In one step of the method, a base body with an angled profile is fabricated out of a blank having an L-shaped profile. For example, the base body is milled out of the blank. In another step of the method, a multipart fastening device is fastened to the reinforcing element and outer skin of the vehicle by way of the base body. This means that the fastening device encompasses the base body with which the fastening device is fastened to the reinforcing element and outer skin of the vehicle. In another step of the method, a top element with an eyelet is fastened to the base body. The eyelet here exhibits an opening, whose axis comes to lie essentially perpendicular to a longitudinal axis of the vehicle if the fastening device is fastened to the reinforcing element and outer skin. Rivet joints can be used to fasten the multipart fastening device to the reinforcing element and outer skin of the vehicle and/or to fasten the top element to the base body.

In an embodiment, the fastening device is fastened to the reinforcing element and outer skin of the vehicle while fastening the top element to the base body. This makes it possible to fasten the top element to both the base body and the reinforcing element or outer skin within a single assembly step. For example, those rivet joints that join the top element with the base body are simultaneously also used to join the base body with the reinforcing element or outer skin of the vehicle. To this end, the rivets of the rivet joints of the top element can penetrate the base body and protrude into the reinforcing element or outer skin of the vehicle.

Another aspect indicates an aircraft with a multipart fastening device for fastening a device to a reinforcing element and the outer skin of a vehicle, wherein the multipart fastening device exhibits the features described above.

For example, the fastening device is joined or fastened to a fuselage shell or outer skin of the aircraft, and with a reinforcing element, e.g., a rib or stringer, of the aircraft.

In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
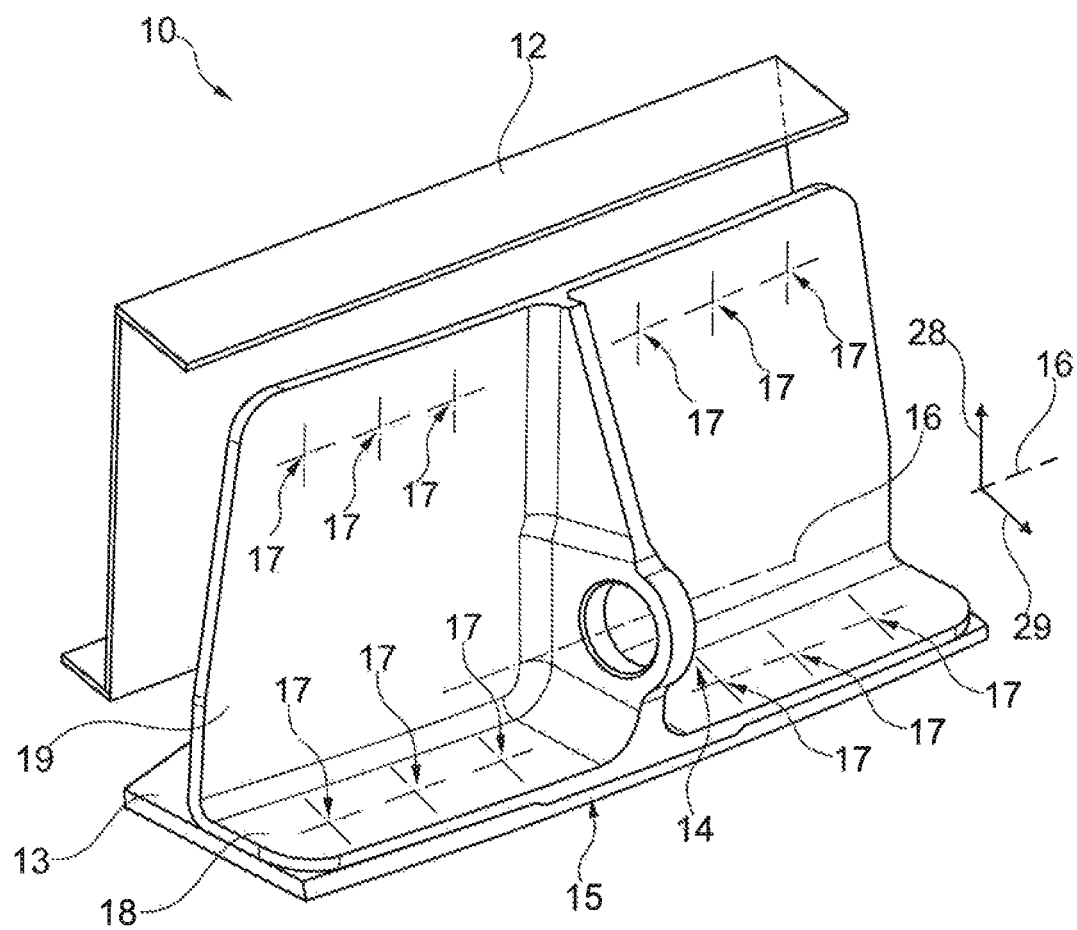
FIG. 1 shows a one-part fastening device for fastening a device to a reinforcing element and to the outer skin of a vehicle according to an exemplary embodiment.

FIG. 1 shows a one-part fastening device 10, which was made out of a block or blank via milling. The one-part fastening device 10 exhibits a first plate-shaped partial area 19 as well as a second plate-shaped partial area 18. The second plate-shaped partial area can also be a shell-shaped partial area 18, whose contour is adjusted to the shape of the outer skin 13 of an airplane fuselage. For example, the shell-shaped partial area 18 of the one-part fastening device 10 is curved or bent along a transverse direction 16. The one-part fastening device 10 exhibits an eyelet 14, wherein the eyelet 14 is designed in the form of a passage opening in the transverse direction 16. As a consequence, the transverse direction 16 can essentially be parallel to a drilling axis of the eyelet 14. In the state depicted on FIG. 1, the fastening device 10 is made to contact the outer skin 13 of the vehicle or airplane by means of a contact surface or surface of the shell-shaped element 18. The fastening device 10 is further joined with the outer skin 13 of the airplane by way of rivet joints 17. The fastening device 10 is here fastened to the outer skin 13 of the airplane by a total of six rivets 17. The first plate-shaped partial area 19 as well as the shell-shaped partial area 18 are angled relative to each other. For example, both areas are arranged at an obtuse angle relative to each other. Further provided is a web, which joins the two angled areas together, and is provided with the eyelet 14. In terms of the transverse direction 16, this web, and hence the eyelet 14, is centrally secured to the fastening device 10. The transverse direction 16 is here essentially perpendicular to the flight direction of the airplane or to a longitudinal axis 29 of the airplane. The first plate-shaped partial area 19 extends essentially parallel to a vertical direction 28, which is perpendicularly aligned relative to the transverse direction 16 and longitudinal direction 29. As a consequence, the vertical direction 28 is essentially parallel to a contact surface between the first plate-shaped partial area 19 and a reinforcing element 12 of the airplane. For example, such a reinforcing element 12 is a rib or stringer of the airplane. In the state depicted on FIG. 1, the fastening device 10 is not joined or fastened to reinforcing element 12 for reasons of clarity. In a fastened state, however, the fastening device 10 is in contact both with the outer skin 13 of the airplane and the reinforcing element 12 of the airplane, and here fastened by means of rivet joints 17 to the outer skin 13 and reinforcing element 12. For example, six rivets 17 are also provided for the first plate-shaped partial area 19, and fasten the fastening device 10 to the reinforcing element 12. The contact surface between the first partial area 19 and the reinforcing element 12 is here a flat surface, for example. This flat surface is stretched by the transverse direction 16 and by the vertical direction 28, for example. The shell-shaped partial area 18 of the fastening device 10 exhibits a bulge 15 or projection, for example, which engages into a recess in the outer skin 13 when the fastening device 10 is fastened to the reinforcing element 12 as well as to the outer skin 13 of the airplane. For example, in the fastened state, this bulge 15 projects into the outer skin 13 of the airplane, essentially parallel to the vertical direction 28. The bulge 15 is centrally arranged on the fastening device 10 in relation to the transverse axis 16, and is located in the area of the web and/or eyelet 14 of the fastening device 10. The diameter of the eyelet 14, which is circular in shape, measures between 15 and 20 mm. The diameter of the eyelet preferably measures between 16 and 17 mm. The eyelet 14 is designed as a hole drilled through the web in the transverse direction.

Figure 2:
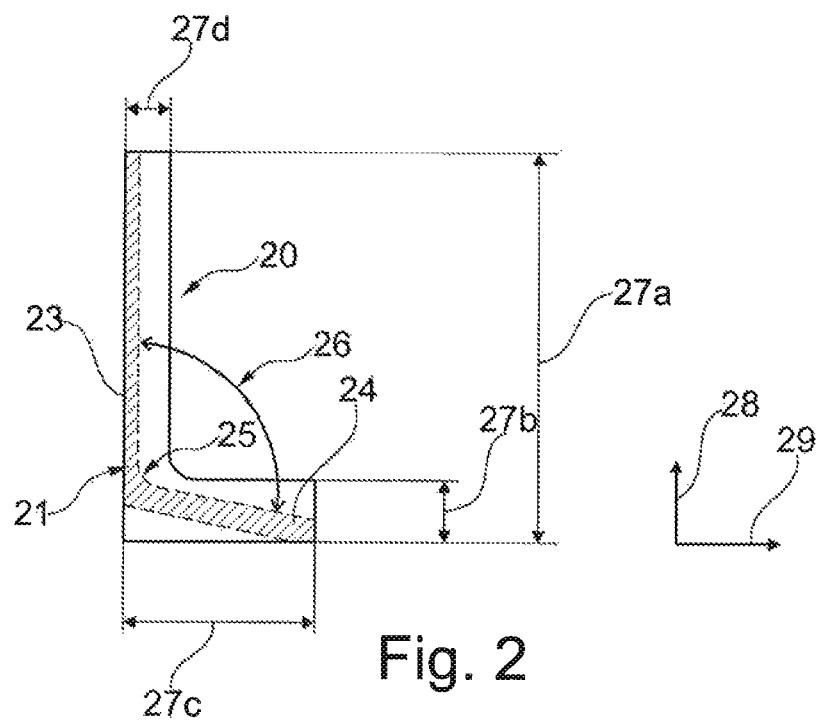
FIG. 2 shows a cross sectional view of an L-profile as well as of a base body of a fastening device for fastening a device to a reinforcing element and to the outer skin of a vehicle according to an exemplary embodiment.

FIG. 2 shows a blank 20 or block from which a base body of a multipart fastening device is fabricated. For example, the blank 20 is a profile with an L-shaped cross section, from which a base body 21 of a multipart fastening device is fabricated. For example, the base body 21 of the multipart fastening device is milled out of the L-shaped profile. The base body 21 is shown with a dashed line on FIG. 2. The L-profile exhibits a first expansion 27a in the vertical direction 28, wherein the first expansion 27a can simultaneously also be the maximum expansion of the base body 21 in the vertical direction 28. For example, the first expansion 27a measures 90.5 mm. The L-profile exhibits a second expansion 27b, also in the vertical direction. For example, this second expansion 27b measures 15.5 mm. In the longitudinal direction 29, the L-profile exhibits a third expansion 27c, for example measuring 43 mm. A fourth expansion 27d, also in the longitudinal direction 29, measures 9.5 mm. The first expansion 27a and third expansion 27c are here each length measures of flanges or legs of the L-profile. The second expansion 27b as well as the fourth expansion 27d here each represent thickness measures of the two flanges or legs of the L-profile. The maximum expansion of the base body 21 in the longitudinal direction 29 can be described by the third expansion 27c. As depicted on FIG. 2, the base body 21 fabricated out of the L-profile exhibits a similar cross sectional contour as the L-profile. As a result, the material removed while milling, i.e., while manufacturing the base body 21 out of the L-profile, can be significantly reduced. The base body 21 exhibits an angled profile similar to the L-profile. However, instead of a right angle, an obtuse angle 26 is provided for the L-profile between a first plate-shaped partial area 23 and a second plate-shaped partial area 24 after manufacture. However, this can also be an acute or right angle. For example, the obtuse angle 26 measures between 90° and 110°. In addition, a radius 25 is provided in the area of the transition between the first plate-shaped partial area 21 and the second plate-shaped partial area 24. The second plate-shaped partial area 24 can be a shell-shaped element, which is curved in the transverse direction 16 of the base body 21, i.e., in the viewing direction on FIG. 2, and thus adjusted to the outer skin 13 of the airplane fuselage. However, this curvature is not visible on FIG. 2, since only a cross section of the L-profile or base body 21 of the multipart fastening device is shown.

Figure 3:
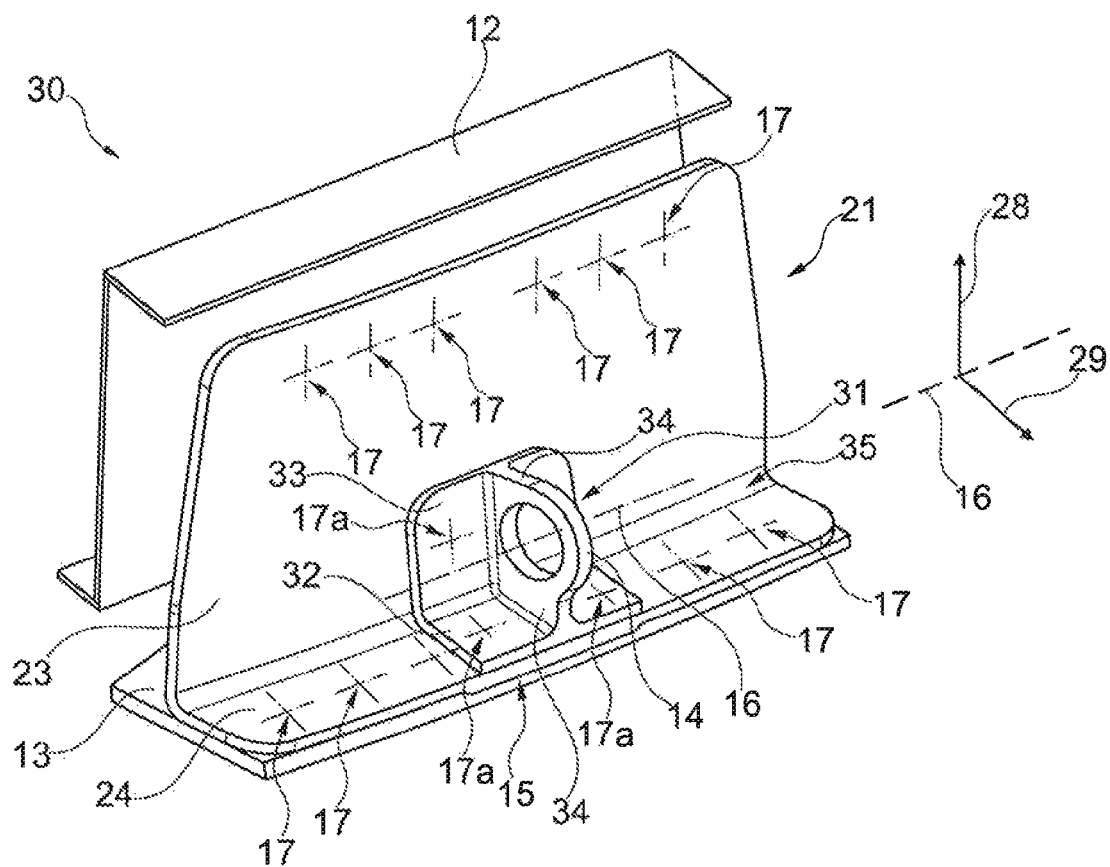
FIG. 3 shows a multipart fastening device for fastening a device to a reinforcing element and to the outer skin of a vehicle according to an exemplary embodiment.

FIG. 3 shows a multipart fastening device 30, which can be fastened to a reinforcing element 12 and to the outer skin 13 of an airplane. In the state depicted on FIG. 3, the multipart fastening device 30 is fastened to the outer skin 13 of the airplane, but not to the reinforcing element 12. However, this only serves to clarify the illustration, so that with the fastening device 30 in the fastened state, it is joined both with the reinforcing element 12 and the outer skin 13, for example via rivet joints 17. The multipart fastening device 30 exhibits a base body 21 and a top element 31. The top element 31 can be fastened to the base body 21 by means of four rivets 17a. The base body 21 can in turn be fastened to the reinforcing element 12 as well as to the outer skin 13 of the airplane with additional rivets 17. For example, the reinforcing element is a rib or stringer of the airplane. In the case illustrated here, the reinforcing element 12 is a rib of the airplane. The base body 21 exhibits a first plate-shaped partial area 23 and a shell-shaped partial area 24, wherein the two areas 23, 24 are angled relative to each other. For example, the first plate-shaped partial area 23 and shell-formed partial area 24 are arranged relative to each other at an angle of between 90 and 110°. However, an acute angle or right angle can also be provided. The shell-shaped partial area 24 can be adjusted to the contour or outer skin 13 of the airplane fuselage in one circumferential direction of the latter, thereby resulting in a curvature of the shell-shaped partial area 24 in the circumferential direction of the airplane fuselage. The circumferential direction is here aligned perpendicular to the longitudinal direction 29. The longitudinal direction 29 is essentially parallel to the longitudinal direction of the airplane fuselage. The plate-shaped partial area 23 at least partially exhibits a thickness of 2.5 mm. The shell-shaped partial area 24 also at least partially exhibits a thickness of 2.5 mm. However, the shell-shaped partial area 24 has a bulge 15 in an area of the base body 21 in which the top element 31 is fastened to the base body 21. The bulge 15 or projection represents a thickening of the shell-shaped element 24, which protrudes into the outer skin 13 essentially parallel to the vertical axis 28. The thickness of the shell-shaped element 24 is greater than 3 mm at this location, for example. The base body 21 can be fabricated out of a titanium alloy, wherein the top element is fabricated out of an aluminum alloy. The top element exhibits a third plate-shaped partial area 33 along with a fourth plate-shaped partial area 32. The third plate-shaped partial area 33 of the top element 31 is here directly joined with the first plate-shaped partial area 23 of the base body 21 by way of a contact surface. Analogously, the fourth plate-shaped partial area 32 of the top element 31 is directly joined with the base body 21 by way of a contact surface. Two respective rivets 17a here penetrate through the third plate-shaped partial area 33 along with the fourth plate-shaped partial area 32 of the top element 31, and fasten the top element 31 to the base body 21. The top element 31 exhibits an eyelet 14, which is circular in shape, and has an opening with a central axis that is essentially parallel to the transverse direction 16. The eyelet 14 is joined with the plate-shaped partial areas 33, 34 of the top element 31 by means of a web 34. This web 34 extends in a circumferential direction around the eyelet 14, at least partially around the latter. In the multipart fastening devices 30 shown on FIG. 3, a total of 14 rivet joints serve to fasten the multipart fastening device 30 to the reinforcing element 12 and to the outer skin 13 of the airplane. Any number of rivet joints desired can be used, however. The rivets 17a fasten the top element 31 to the base body 21 and to the reinforcing element 12, as well as to the outer skin 13, so that the rivets 17a can respectively penetrate through the base body 21. The eyelet 14 is used to fasten a device, such as a vacuum generator for wastewater tanks, or some other component to the airplane structure. The diameter of the eyelet 14, which is circular in shape, measures between 15 and 20 mm. The diameter of the eyelet preferably measures between 16 and 17 mm. The eyelet 14 is designed as a hole drilled through the web in the transverse direction. The fourth plate-shaped partial area 32 of the top element 31 can also be shell-shaped in design, so that the contour of this area 32 of the top element 31 adjusts to the contour of the shell-shaped partial area 24 of the base body 21. The multipart fastening device 30 makes it possible to save on material during the manufacture of the base body 21 and top element 31, since the top element 31 and base body 21 can be fabricated in separate production processes. This also enables a cost reduction and a reduction in fabrication time by comparison to manufacturing a one-part fastening device of the kind depicted on FIG. 1.

Figure 4:
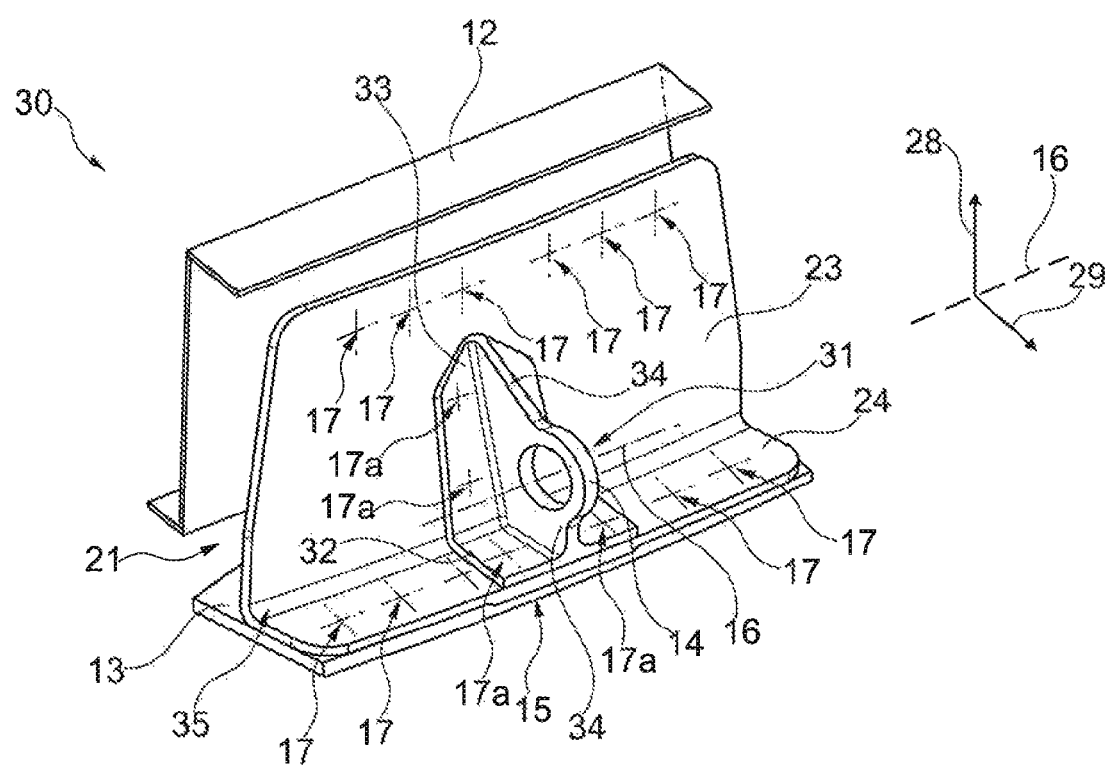
FIG. 4 shows a multipart fastening device for fastening a device to a reinforcing element and to the outer skin of a vehicle according to another exemplary embodiment.

FIG. 4 presents another example of a multipart fastening device 30, which is fastened to a reinforcing element 12 as well as to the outer skin 13 of an airplane. As opposed to the multipart fastening device 30 shown on FIG. 3, the top element 31 exhibits a third plate-shaped partial area 33, which in relation to the vertical direction 28 extends at least over half the expansion of the first plate-shaped area 23 of the base body 21 in a vertical direction 28. The web 34 of the top element 31 here extends perpendicular to the transverse direction 16 along the entire third plate-shaped partial area 33 and the entire fourth plate-shaped partial area 32 of the top element 31. The web 34 here protrudes perpendicularly out of a surface of the third plate-shaped partial area 33 and the fourth plate-shaped partial area 32. In the example shown, the top element 31 is further fastened by means of a total of six rivets to the base body 21 and/or to the reinforcing element 12 as well as the outer skin 13 of the airplane. For example, four rivets 17a here penetrate through the first plate-shaped partial area 23 of the base body 21 and/or through the third plate-shaped partial area 33 of the top element 31, and thereby create the attachment to the reinforcing element 12. By contrast, for example, two rivets 17a penetrate through the second plate-shaped or shell-shaped partial area 24 of the base body 21 and/or the fourth plate- or shell-shaped partial area 32 of the top element 31, and thereby fasten the top element 31 and base body 21 to the outer skin 13. The web 34 divides the third plate-shaped partial area 33 of the top element 31 into two halves, so that two respective rivets 17a are provided on each of the two halves. Viewed in the transverse direction 16, the web 34 is in the middle of the top element 31 and/or in the middle of the base body 21.

Figure 5:
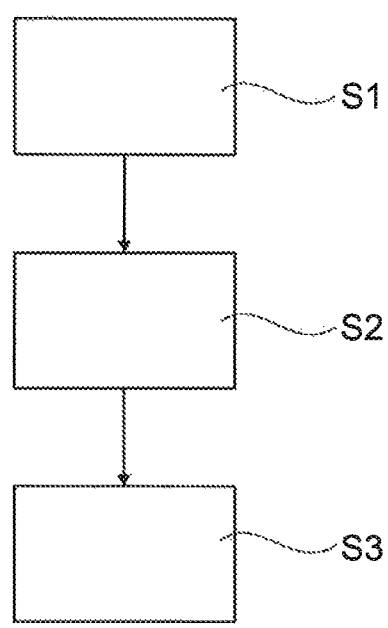
FIG. 5 shows a flowchart for a method for fastening a device to a reinforcing element and to the outer skin of a vehicle according to an exemplary embodiment.

FIG. 5 presents a flowchart depicting a method for fastening a device to a reinforcing element 12 and to the outer skin 13 of a vehicle. For example, the device is a vacuum generator of a wastewater tank or some other hydraulic device. For example, the vehicle is an aircraft. In particular, the vehicle is an airplane. In step S1 of the method, a base body 21 with an angled profile is fabricated out of a blank 20 with an L-shaped profile. In step S2 of the method, a multipart fastening device 30 is fastened to a reinforcing element 12 and to the outer skin 13 of the vehicle by way of the base body 21. In a further step S3, a top element 31 with an eyelet 14 is fastened to the base body 21. The method can consist of additional steps. In particular, a further step involves fastening the device by way of a rod-shaped component in the eyelet 14 of the top element 31. The device can here be hinged in the eyelet 14 via the rod-shaped component. Let it be noted that the base body 21 can be fastened to the reinforcing element 12 and to the outer skin 13 at the same time the top element 31 is fastened to the base body 21.

In addition, let it be noted that "encompassing", "comprising" and "exhibiting" do not preclude any other elements or steps, and that "a" or "an" do not rule out a plurality. Let it further be noted that features or steps described with reference to one of the above exemplary embodiments can also be used in combination with other features or steps in other exemplary embodiments described above. Reference numbers in the claims are not to be construed as limitations. Let it be noted as well that the procedural steps of the described method can be performed in any sequence. Additionally, it is possible to perform several procedural steps simultaneously.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A multipart fastening device for fastening a device to a reinforcing element and to an outer skin of a vehicle, comprising:
   a base body in the form of an angled profile configured to fasten the fastening device to the reinforcing element and to the outer skin of the vehicle; and
   a top element with an eyelet that is fastened to the base body,
   wherein the base body comprises a first material, and the top element consists of a second material that differs from the first material;
   wherein the second material is lighter than the first material.

2. The multipart fastening device according to claim 1, wherein the base body is fastened to the reinforcing element and to the outer skin by means of a rivet joint.

3. The multipart fastening device according to claim 1, wherein the top element is fastened to the base body by means of a rivet joint.

4. The multipart fastening device according to claim 1, wherein the reinforcing element is selected from the group comprised of ribs, stringers, and frame structure.

5. The multipart fastening device according to claim 1, wherein the base body of an angled profile comprises a first plate-shaped partial area and a second plate-shaped partial area that are inclined relative to each other at an obtuse angle.

6. The multipart fastening device according to claim 5, wherein the angle is between 90 degrees and 110 degrees.

7. A multipart fastening device for fastening a device to a reinforcing element and to an outer skin of a vehicle, comprising:
   a base body in the form of an angled profile configured to fasten the fastening device to the reinforcing element and to the outer skin of the vehicle; and
   a top element with an eyelet that is fastened to the base body,
   wherein the base body comprises a first material, and the top element consists of a second material that differs from the first material;
   wherein the second material is lighter than the first material;
   wherein the base body is fastened to the reinforcing element and to the outer skin by means of a rivet joint, and
   wherein the top element is fastened to the base body by means of a rivet joint.

8. The multipart fastening device according to claim 7, wherein the reinforcing element is selected from the group comprised of ribs, stringers, and frame structure.

9. The multipart fastening device according to claim 8, wherein the angled profile comprises a first plate-shaped partial area and a second plate-shaped partial area that are inclined relative to each other at an obtuse angle, and
   wherein the angle is between 90 degrees and 110 degrees.

10. The multipart fastening device according to claim 9, wherein the first material is a titanium alloy, and the second material is an aluminum alloy.

* * * * *